United States Patent [19]
Church et al.

[11] Patent Number: 6,000,221
[45] Date of Patent: Dec. 14, 1999

[54] SYSTEM FOR CONTROLLING A VARIABLE GEOMETRY TURBOCHARGER

[75] Inventors: Peter D. Church, Ypsilanti, Mich.; Christopher M. Rieflin, Portland, Oreg.

[73] Assignee: Detroit Diesel Corporation, Detroit, Mich.

[21] Appl. No.: 08/964,343

[22] Filed: Nov. 4, 1997

[51] Int. Cl.⁶ .................................................. F02B 37/24
[52] U.S. Cl. ............................................................ 60/602
[58] Field of Search .............................. 60/600, 601, 602, 60/603

[56] References Cited

U.S. PATENT DOCUMENTS

| | | |
|---|---|---|
| 4,075,849 | 2/1978 | Richardson . |
| 4,203,296 | 5/1980 | Tanaka et al. . |
| 4,292,806 | 10/1981 | Moore et al. . |
| 4,397,285 | 8/1983 | O'Neill . |
| 4,428,199 | 1/1984 | Moore et al. ............................. 60/600 |
| 4,442,672 | 4/1984 | Fischer . |
| 4,467,607 | 8/1984 | Rydguist et al. . |
| 4,489,557 | 12/1984 | Fawcett et al. . |
| 4,671,068 | 6/1987 | Moody et al. . |
| 4,679,398 | 7/1987 | Noguchi et al. . |
| 4,680,933 | 7/1987 | Bozung et al. . |
| 4,697,421 | 10/1987 | Otobe et al. . |
| 4,741,163 | 5/1988 | Hidaka et al. . |
| 4,745,755 | 5/1988 | Kawamura . |
| 4,779,423 | 10/1988 | Szczupak ................................... 60/602 |
| 4,848,086 | 7/1989 | Inoue . |
| 4,953,110 | 8/1990 | Chartrand . |
| 5,069,194 | 12/1991 | Deutschmann et al. . |
| 5,123,246 | 6/1992 | Younessi et al. . |
| 5,148,364 | 9/1992 | Scherer . |
| 5,186,081 | 2/1993 | Richardson . |
| 5,231,830 | 8/1993 | Entenmann et al. . |
| 5,261,236 | 11/1993 | Ironside et al. . |
| 5,445,128 | 8/1995 | Letang et al. . |
| 5,477,827 | 12/1995 | Weisman et al. . |
| 5,622,053 | 4/1997 | Freen . |
| 5,709,192 | 1/1998 | Zimmermann . |
| 5,769,052 | 6/1998 | Oestreicher et al. . |
| 5,771,867 | 6/1998 | Amstutz et al. . |
| 5,791,145 | 8/1998 | Freen . |

FOREIGN PATENT DOCUMENTS 3005108  8/1981  Germany .................................. 60/602

OTHER PUBLICATIONS

SAE Technical Paper Series, "Electronic Control Of A Variable Geometry Turbocharger", Dilip Jain, May 3, 1990 SAE Library.

SAE Technical Paper Series, "Schwitzer Variable Geometry Turbo and Microprocessor Control Design and Evaluation", Steve Arnold, SAE Library, Feb. 16, 1987.

R. Schulmeister, et al., Advanced Diesel Engines With Integrated Electronic Systems, ImechE, 1991, C430/012, Germany.

SAE Technical Paper Series, 951201, "Electronic Engine Management on an MTU 396 Heavy Duty Truck Engine", Steffan Spindler, SAE Library, 1995.

*Primary Examiner*—Michael Koczo
*Attorney, Agent, or Firm*—Brooks & Kushman P.C.

[57] ABSTRACT

A system for controlling a vehicle having an internal combustion engine and a variable geometry turbocharger includes a turbocharger sensor having an output indicative of a current turbocharger geometry. Turbocharger geometry is varied by a controllable actuator. Control logic determines a desired turbocharger geometry based on the current engine conditions. Control logic determines an error signal by comparing the current turbocharger geometry to the desired turbocharger geometry. The actuator is controlled based on the error signal to change the current turbocharger geometry so as to track the desired turbocharger geometry.

15 Claims, 6 Drawing Sheets

6,000,221

SYSTEM FOR CONTROLLING A VARIABLE GEOMETRY TURBOCHARGER

TECHNICAL FIELD

The present invention relates to systems and methods for controlling a vehicle having an internal combustion engine including a variable geometry turbocharger.

BACKGROUND ART

In the control of internal combustion engines, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units to control various functions, which may include various aspects of fuel delivery, transmission control, turbocharger control, or many others.

A turbocharger consists of a turbine and a compressor. The pressure of the engine exhaust gases causes the turbine to spin. The turbine drives the compressor, which is typically mounted on the same shaft. The spinning compressor creates turbo boost pressure which develops increased power during combustion.

A variable geometry turbocharger has movable components in addition to the rotor group. These movable components can change the turbocharger geometry by changing the area or areas in the turbine stage through which exhaust gases from the engine flow, and/or changing the angle at which the exhaust gases enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a variable geometry turbocharger, the turbine housing is oversized for an engine, and the exhaust gas flow is choked down to the desired level. There are several designs for the variable geometry turbocharger. In one design, a variable inlet nozzle has a cascade of movable vanes which are pivotable to change the area and angle at which the exhaust gas flow enters the turbine wheel. In another design, the turbocharger has a movable side wall which varies the effective cross-sectional area of the turbine housing.

A conventional variable geometry turbocharger control system utilizes an electronic controller having a boost map stored therein. The boost map contains the optimum boost for an engine as a function of engine operating conditions. The controller monitors the engine operating conditions using sensors, and determines the desired boost from the boost map. Turbocharger geometry is incrementally adjusted based on the desired boost pressure obtained from the boost map.

A primary disadvantage associated with existing variable geometry turbocharger control systems is the fact that turbo boost pressure has a slow response time to incremental changes in turbocharger geometry. Because the optimum boost from the boost map varies continuously with varying engine operating conditions, the slow response time of the turbo boost pressure to the incremental changes in turbocharger geometry make is difficult to obtain precise control of the turbocharger. This slow response time renders many of the emissions and driveability benefits of the variable geometry turbocharger unachievable.

SUMMARY OF THE INVENTION

It is therefore an object of the present invention to provide an improved system and method for controlling a vehicle having an internal combustion engine including a variable geometry turbocharger.

It is another object of the present invention to provide a system and method for controlling a vehicle having an internal combustion engine including a variable geometry turbocharger which allows precise turbo boost pressure control over a wide range of engine operating conditions.

In carrying out the above objects and other objects and features of the present invention, a system and method for controlling a vehicle having an internal combustion engine, a plurality of engine sensors having outputs indicative of current engine conditions, and a variable geometry turbocharger, is provided. Turbocharger geometry is varied by a controllable actuator. The system comprises a turbocharger sensor having an output indicative of turbocharger geometry, control logic for determining a desired turbocharger geometry based on the current engine conditions, and control logic for determining an error signal by comparing the current turbocharger geometry to the desired turbocharger geometry. Control logic controls the actuator based on the error signal to change the current turbocharger geometry so as to track the desired turbocharger geometry.

Preferably, the system further comprises control logic for determining an action signal based on the error signal, when error signal magnitude exceeds an action threshold value. Control logic determines at least one control term, and a modulated signal based on the at least one control term and the action signal. The modulated signal is applied to an input of the actuator.

Further, in a preferred embodiment, the system includes control logic for selecting an engine operating mode from the group consisting of a normal mode and at least one special mode based on the current engine conditions, and control logic for determining desired turbocharger geometry in each of the engine operating modes. In the normal mode, the control logic determines a filtered rate of change of a first engine parameter based on the current engine conditions. Desired turbocharger geometry is determined for steady state conditions of the first engine parameter; and, desired turbocharger geometry is determined for transient conditions of the first engine parameter.

The desired turbocharger geometry is based on the desired turbocharger geometry for steady state conditions of the first engine parameter, the desired turbocharger geometry for transient conditions of the first engine parameter, and the filtered rate of change the first engine parameter. Preferably, the desired turbocharger geometry is further based on a geometry offset. The geometry offset is based on a filtered rate of change of a second engine parameter.

Still further, in a preferred embodiment, control logic determines desired turbocharger geometry based on an engine speed parameter indicative of engine speed, and an engine torque parameter indicative of engine torque demand. Additionally, desired turbocharger geometry may be further based on a filtered rate of change of the engine speed parameter and a filtered rate of change of the engine torque parameter.

Further, in accordance with the present invention, an article of manufacture including a computer readable storage medium having information stored thereon representing instructions executable by a computer to control a vehicle having an internal combustion engine including a variable geometry turbocharger is provided. A computer readable storage medium further comprises instructions for determining a current turbocharger geometry based on a turbocharger sensor output, instructions for determining a desired turbocharger geometry, instructions for determining an error signal, and instructions for controlling the actuator.

Still further, in accordance with the present invention, a method for controlling a vehicle having an internal combustion engine including a variable geometry turbocharger is provided. The method comprises determining a current turbocharger geometry based on a turbocharger sensor output, determining a desired turbocharger geometry based on current engine conditions, determining an error signal, and controlling the actuator.

The advantages accruing to the present invention are numerous. For example, systems and methods of the present invention are capable of controlling a variable geometry turbocharger with such precision, that turbo boost pressure is accurately controllable over a wide range of engine speeds, loads, and operating modes.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
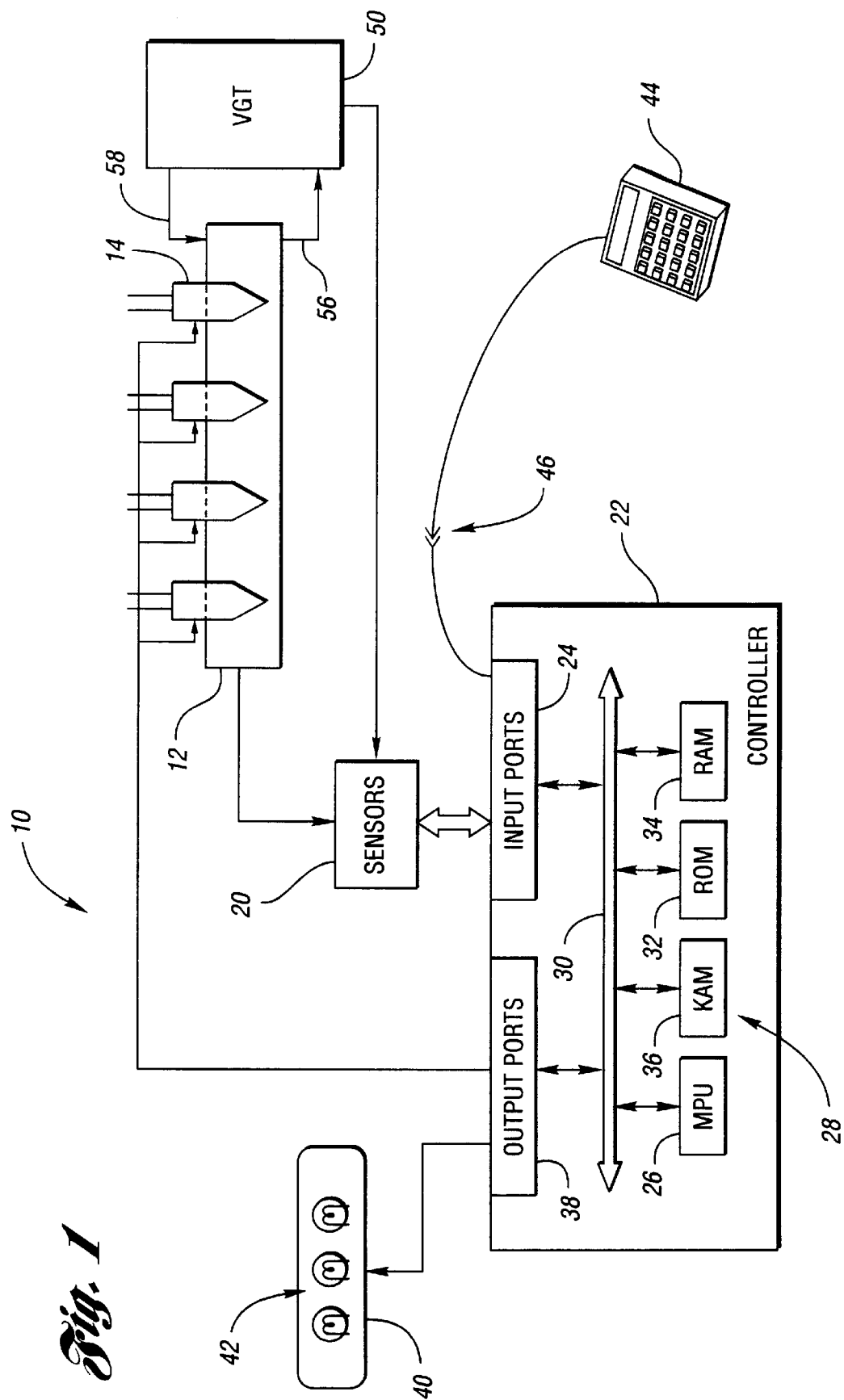
FIG. 1 is a schematic diagram of a system for controlling a vehicle having an internal combustion engine including a variable geometry turbocharger.

Referring now to FIG. 1, a system for controlling a vehicle is shown. The system, generally indicated by reference numeral 10, includes an internal combustion engine 12 having a plurality of cylinders, each fed by a fuel injector 14. In a preferred embodiment, engine 12 is a compression-ignition internal combustion engine, such as a four, six, eight, twelve, sixteen or twenty-four-cylinder diesel engine, or a diesel engine having any other desired number of cylinders. Fuel injectors 14 receive pressurized fuel from a supply connected to one or more high or low pressure pumps (not shown) as is well known in the art. Alternatively, embodiments of the present invention may employ a plurality of unit pumps (not shown), each pump supplying fuel to one of the injectors 14.

The system 10 includes a variable geometry turbocharger 50 for drawing air into the cylinders to create increased power during combustion. Engine exhaust is routed to the turbocharger turbine inlets along lines 56. Air drawn into the engine air intake is routed through the compressor and to the engine through air inlet lines 58. It is to be understood that the single turbo turbocharging system is shown for purposes of illustration, and that systems and methods of the present invention may be employed in a multiple turbo turbocharging system.

The system 10 may also include various sensors 20 for generating signals indicative of corresponding operational conditions or parameters of engine 12, the vehicle transmission (not shown), turbocharger 50, and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36, and the like. The computer readable storage media may be implemented by any of a number of known physical devices capable of storing information representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 implement control logic via software, firmware, hardware, microcode, and/or discrete or integrated circuitry to effect control of various systems and subsystems of the vehicle, such as engine 12, a vehicle transmission (not shown), turbocharger 50, and the like. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables, fault threshold values, action threshold values, control logic, look-up table values, and the like.

In operation, controller 22 receives signals from sensors 20 and executes control logic to control one or more variable geometry turbochargers by controlling an actuator capable of changing the current turbocharger geometry so as to track the desired turbocharger geometry. The desired turbocharger geometry is determined based on any number of engine conditions and/or parameters indicative of engine conditions. For example, an engine speed parameter indicative of engine speed, a filtered rate of change of the engine speed parameter, an engine torque parameter indicative of current engine torque demand, and/or a rate of change of the engine torque parameter may be used as a basis for the desired turbocharger geometry. Further, other engine conditions and/or parameters indicative of such conditions may be used as desired. In a preferred embodiment, controller 22 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety.

With continuing reference to FIG. 1, a logic controller, such as microprocessor 26, controls the signals sent to the fuel injectors 14. Microprocessor 26 determines a provisional engine torque demand based on operator demand and current operating conditions. The provisional engine torque may be subject to adjustments for cylinder balancing and/or other adjustments to determine an applied engine torque demand, as desired. The signals sent to fuel injectors 14 are then based on the applied engine torque demand. In variable geometry turbocharging system 50, microprocessor 26 determines the turbocharger system mode of operation, such as normal mode, start mode, idle mode, or engine braking mode, based on the current engine operating conditions. The desired turbocharger geometry is preferably determined from look-up tables corresponding to the current engine mode of operation, and indexed by an engine speed parameter and engine torque parameter as will be described.

As will be appreciated by one of ordinary skill in the art, the control logic may be implemented or effected in any one or combination of a variety of control logic methodologies. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
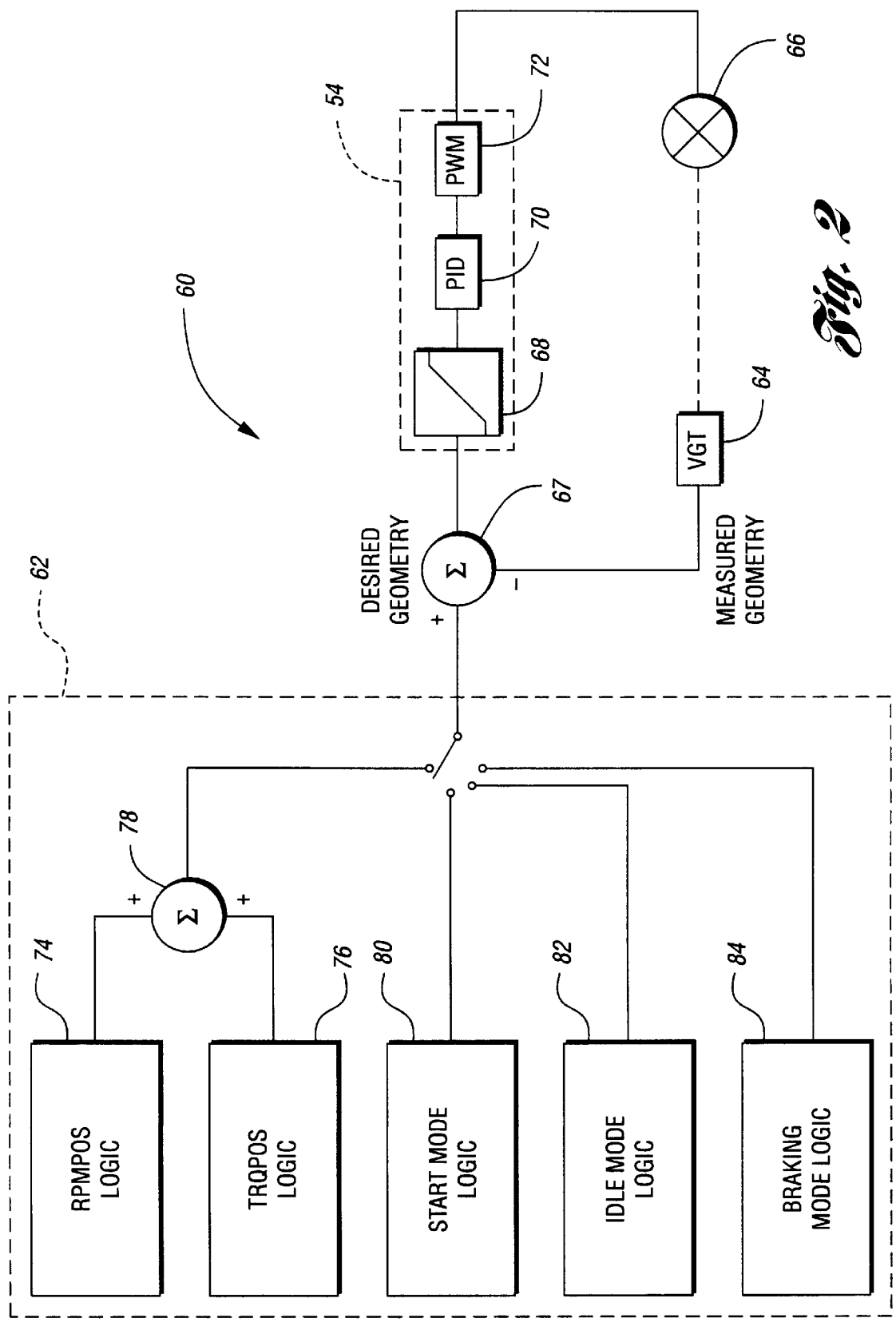
FIG. 2 is a block diagram of a closed loop control system of the present invention which controls an actuator based on a turbocharger geometry error signal.

Referring to FIG. 2, a closed loop control system 60 for controlling a vehicle having an internal combustion engine including a variable geometry turbocharger 64 is illustrated. The control system 60 is implemented via control logic, a plurality of engine sensors having outputs indicative of current engine conditions, and a turbocharger sensor having an output indicative of current turbocharger geometry. Variable geometry turbocharger 64 includes a controllable actuator for varying the turbocharger geometry. The turbocharger geometry sensor may be implemented in a variety of ways, and is preferably a cylinder integrated position sensor. The cylinder is actuable to change the turbocharger geometry by extension or retraction of the piston within the cylinder to effectively adjust the position of a cascade of turbine inlet vanes. Alternatively, the extension or retraction of the piston within the cylinder may effectively adjust the position of a moveable side wall. Known sensors for in-cylinder applications include the linear variable inductance transducer (LVIT) and the linear resistive transducer (LRT). The cylinder is preferably actuated by a fluid source which is controlled by a valve 66. It is to be appreciated that other types of actuator/sensor arrangements may be contemplated.

The valve 66 is connected to a suitable fluid source and is electronically actuable to change the geometry of the turbocharger by moving the piston within the cylinder. The position of the piston with respect to the cylinder determines the turbocharger geometry. The in-cylinder sensor is capable of sensing the piston position which is indicative of current turbocharger geometry.

The closed loop control system 60 includes control logic 62 for determining a desired turbocharger geometry based on the current engine conditions. The closed loop control system 60 further includes control logic for determining a current turbocharger geometry, for example, by processing the output of the in-cylinder position sensor of variable geometry turbocharger 64. Control logic 67 determines an error signal by comparing the current turbocharger geometry to the desired turbocharger geometry. Control logic 54 controls the actuator such as valve 66, based on the error signal to change the current turbocharger geometry so as to track the desired turbocharger geometry.

Control logic 54 preferably includes control logic 68 for determining an action signal. The action signal is equal to zero whenever the magnitude of the error signal has not exceeded an action threshold value. When the error signal magnitude exceeds the action threshold value, control logic 68 limits the action signal between a maximum positive step and a maximum negative step. Preferably, the action threshold has some hysteresis to prevent action signal toggling. Further, the positive and negative threshold values need not be the same; and, the amount of hysteresis at each threshold may vary. The action signal is limited by control logic 68 to prevent an excessive response from control logic 70.

Control logic 70 determines at least one control term, and is preferably a proportional, integral, derivative controller. Control logic 70 determines a modulated signal based on its control terms and the action signal. Preferably, control logic 70 cooperates with control logic 72 to determine a pulse width modulated signal. The actuator such as valve 66 is configured for being driven by such a pulse width modulated signal; and, control logic 72 applies the modulated signal to the input of the actuator. It is to be appreciated that pulse width modulation is preferred for a digital control type system; however, other modulation schemes are contemplated such as an amplitude modulated analog signal.

Current turbocharger geometry is monitored by the turbocharger sensor and compared to the desired turbocharger geometry as determined by control logic 62. When the engine is operating in a normal operating mode, RPMPOS logic 74 and TRQPOS logic 76 are used to determine the desired turbocharger geometry. Preferably, a summer 78 adds first and second components of the desired turbocharger geometry from RPMPOS logic 74 and TRQPOS logic 76, respectively. The engine may have other modes of operation such as a start mode in which desired turbocharger geometry is determined by start mode logic 80, and idle mode in which desired turbocharger geometry is determined from idle mode logic 82, and a braking mode (during engine braking) in which desired turbocharger geometry is determined by braking mode logic 84. It is to be appreciated that, in accordance with the present invention, that desired turbocharger geometry as determined in any one of a number of ways by control logic 62, is compared to the current turbocharger geometry as determined from the turbocharger sensor output. The error signal is processed to determine a modulated signal for driving the actuator. The above-described control system 62 provides a closed loop feedback control system in which the loop is closed around turbocharger geometry.

Figure 3:
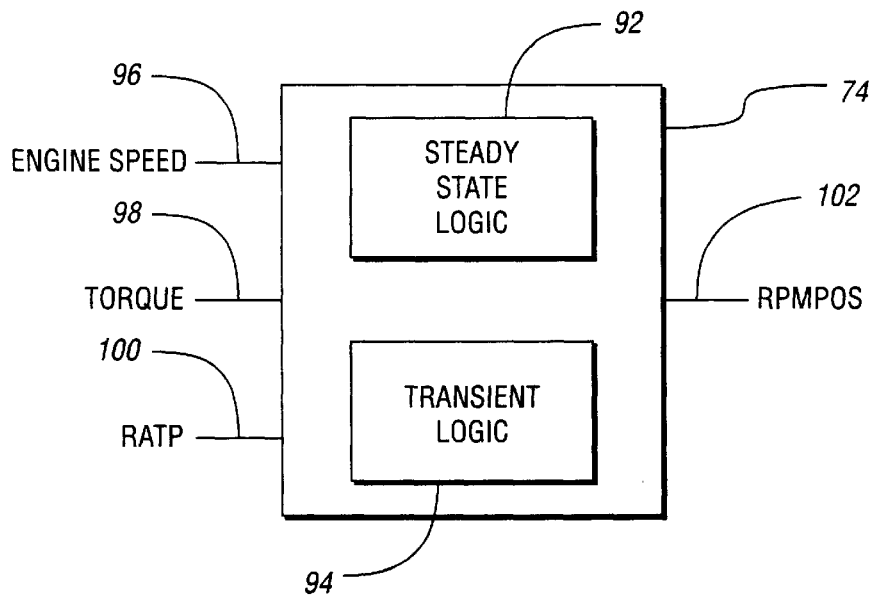
FIG. 3 is a block diagram illustrating control logic for determining RPMPOS which is a first component of desired turbocharger geometry in the normal operating mode.

The controller determines an engine operating mode from the group consisting of a normal mode and at least one special mode, such as a start mode, an idle mode, or a braking mode. As best shown in FIG. 3, RPMPOS logic 74 determines a desired turbocharger geometry when the engine operating mode is the normal mode. Control logic 74 includes steady state logic 92 and transient logic 94. Further, control logic 74 receives a plurality of inputs which preferably include an engine speed parameter 96, a torque demand parameter 98, and an RATP input 100. RATP is indicative of the magnitude of engine speed rate of change. The output 102 of control logic 74 is RPMPOS.

When torque parameter 98 has not exceeded an engine torque demand limit with hysteresis, and engine speed parameter 96 has not exceeded an engine speed limit with hysteresis, RPMPOS is selected as either the output of steady state logic 92 or the output of transient logic 94 based on the RATP input 100. When RATP has not exceeded a RATP threshold with hysteresis, RPMPOS is the output of transient logic 94. When RATP has exceeded the RATP threshold with hysteresis, RPMPOS is the output of steady state logic 92.

Because of the immediate shift between the steady state logic output and the transient logic output based on the value of RATP, much fuel economy may be provided while speeding up reaction to transients in engine speed. When either the desired torque has exceeded the engine torque demand limit or the engine speed has exceeded the engine speed limit, RATP is used directly to provide a less aggressive, gradual transition between steady state logic 92 and transient logic 94 when determining RPMPOS. When desired torque has exceeded the torque limit or engine speed has exceeded the speed limit, RATP is preferably scaled to a value between zero and one, and used to appropriately weight the outputs of steady state logic 92 and transient logic 94 to provide a weighted sum at the RPMPOS output 102. It is to be appreciated that other gradual transition approached may be employed in combination or in the alternative.

Figure 4:
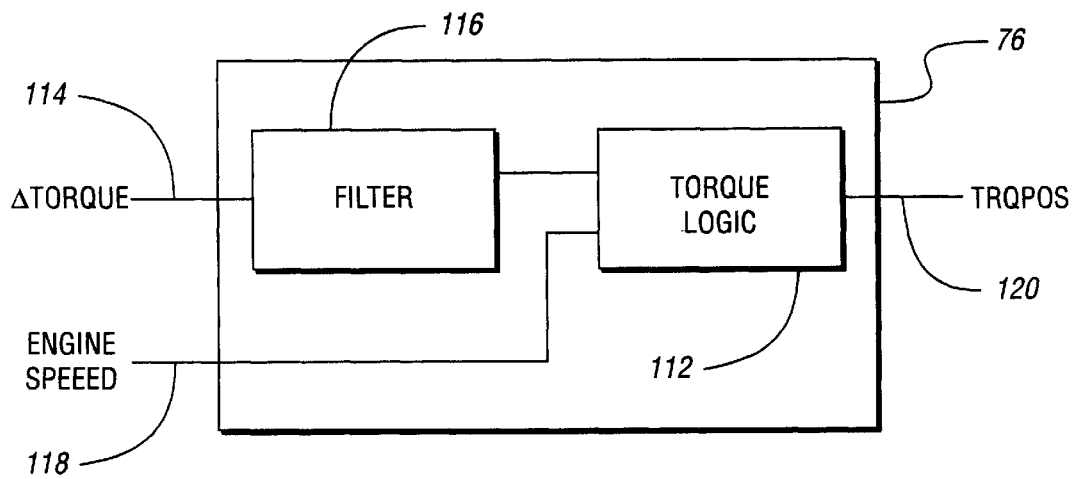
FIG. 4 is a block diagram illustrating control logic for determining TRQPOS which is a second component of desired turbocharger geometry in the normal operating mode.

Referring to FIG. 4, control logic for determining desired turbocharger geometry when the engine operating mode is in normal mode further includes TRQPOS logic 76. TRQPOS logic 76 includes torque logic 112, and receives delta torque input 114 which is the rate of change of the engine torque parameter. TRQPOS logic 76 also receives engine speed parameter 118. Delta torque 114 is processed by filter 116 to determine a filtered rate of change of the engine torque parameter. Filter 116 filters the rate of change of engine torque parameter using a predetermined time constant whenever the rate of change of the engine torque parameter has moved toward zero from either a positive or a negative value. Movement of the rate of change of the engine torque parameter away from zero in either the positive direction, or in the negative direction when the rate of change of engine torque is negative, is preferably unfiltered to allow fast response to sudden high torque demands or sudden engine braking demands. Sudden movements of torque demand toward zero, such as would occur during gear shifting, are filtered with a time constant in anticipation of reapplication of the previous torque demand. Torque logic 112 then determines TRQPOS based on engine speed parameter 118 and the filtered rate of change of the engine torque parameter from filter 116. The TRQPOS output 120 is then summed with the RPMPOS output 102 (FIG. 3) at summer 78 (FIG. 2). TRQPOS provides a turbocharger geometry offset to compensate RPMPOS for torque demand variations.

Referring to FIGS. 3 and 4, steady state logic 92, transient logic 94, and torque logic 112 are preferably implemented via look-up tables. Steady state logic 92 and transient logic 94 are preferably indexed by the engine speed parameter and the engine torque parameter; however, it is to be appreciated that other control schemes may be contemplated which employ other indices, or additional look-up tables such as a strong transient look-up table and a weak transient look-up table, etc. Further, torque logic 112 includes a look-up table which is indexed by filtered rate of change of the engine torque parameter and the engine speed parameter; however, other indices may alternatively be used if so desired. The values contained in the steady state logic, transient logic, and torque logic look-up tables and other look-up tables which may cooperate therewith, contain values having trends to produce desired engine performance results. The trends of the values contained in these look-up tables may vary depending on the desired engine performance such as, for example, maximum fuel economy, maximum performance, etc. Further, the look-up tables may be replaced with or cooperate with other types of models such as analytical functions or piecewise linear models, and other models known by those of ordinary skill in the art.

Figure 5:
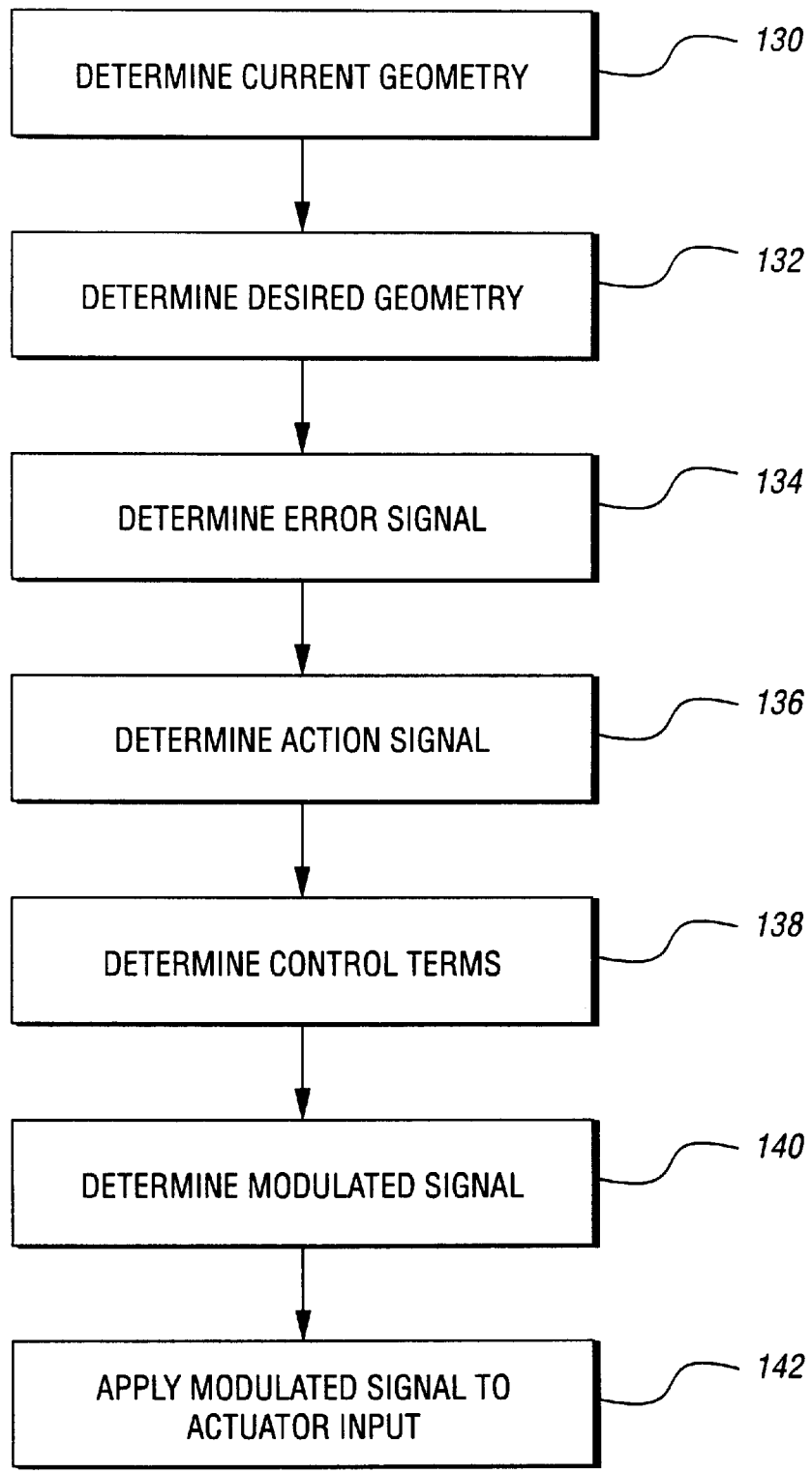
FIG. 5 is a block diagram illustrating a method of the present invention for controlling a variable geometry turbocharger.

Referring to FIG. 5, a method of the present invention for controlling a vehicle having an internal combustion engine including a variable geometry turbocharger is illustrated. At block 130, current turbocharger geometry is determined. The current turbocharger geometry is determined by control logic, such as instructions executable by a computer. The current turbocharger geometry may be determined from any one of a variety of sensor configurations, and is preferably determined from the output of an in-cylinder position sensor located within the piston/cylinder type actuator. At block 132, desired turbocharger geometry for current engine conditions is determined. The desired turbocharger geometry may be determined in a variety of ways, and is preferably determined via the previously described look-up table scheme based on an engine speed parameter, a rate of change of the engine speed parameter, an engine torque parameter, and a rate of change of the engine torque parameter. However, it is to be appreciated that any engine conditions and/or engine parameters indicative of engine conditions may be used to determine the desired turbocharger geometry for the current engine conditions.

At block 134, an error signal is determined. The error signal is determined by comparing the current turbocharger geometry to the desired turbocharger geometry based on the current engine conditions. The current turbocharger geometry is indicated by the turbocharger sensor output, and the desired turbocharger geometry is represented as a desired sensor output. The current turbocharger sensor output is compared to the desired output to determine the error signal.

Preferably, the error signal is limited to determine an action signal; and further, the action signal is only determined when the error signal magnitude exceeds an action threshold value with hysteresis. The action threshold value with hysteresis, and the limiter allow more aggressive controller gains while maintaining stability of the feedback controller.

At block 138, at least one control term is determined. The control terms may include, for example, a proportional term, an integral term, a derivative term, and are preferably implemented as a state space transfer function; however, an analog feedback control system or a combinational analog and digital system may be employed. At block 140, the control terms and action signal are processed to determine a modulated signal. The modulated signal is preferably a pulse width modulated signal for driving the actuator of the variable geometry turbocharger. At block 142, the modulated signal is applied to the actuator input to change the current turbocharger geometry so as to track the desired turbocharger geometry.

Figure 6:
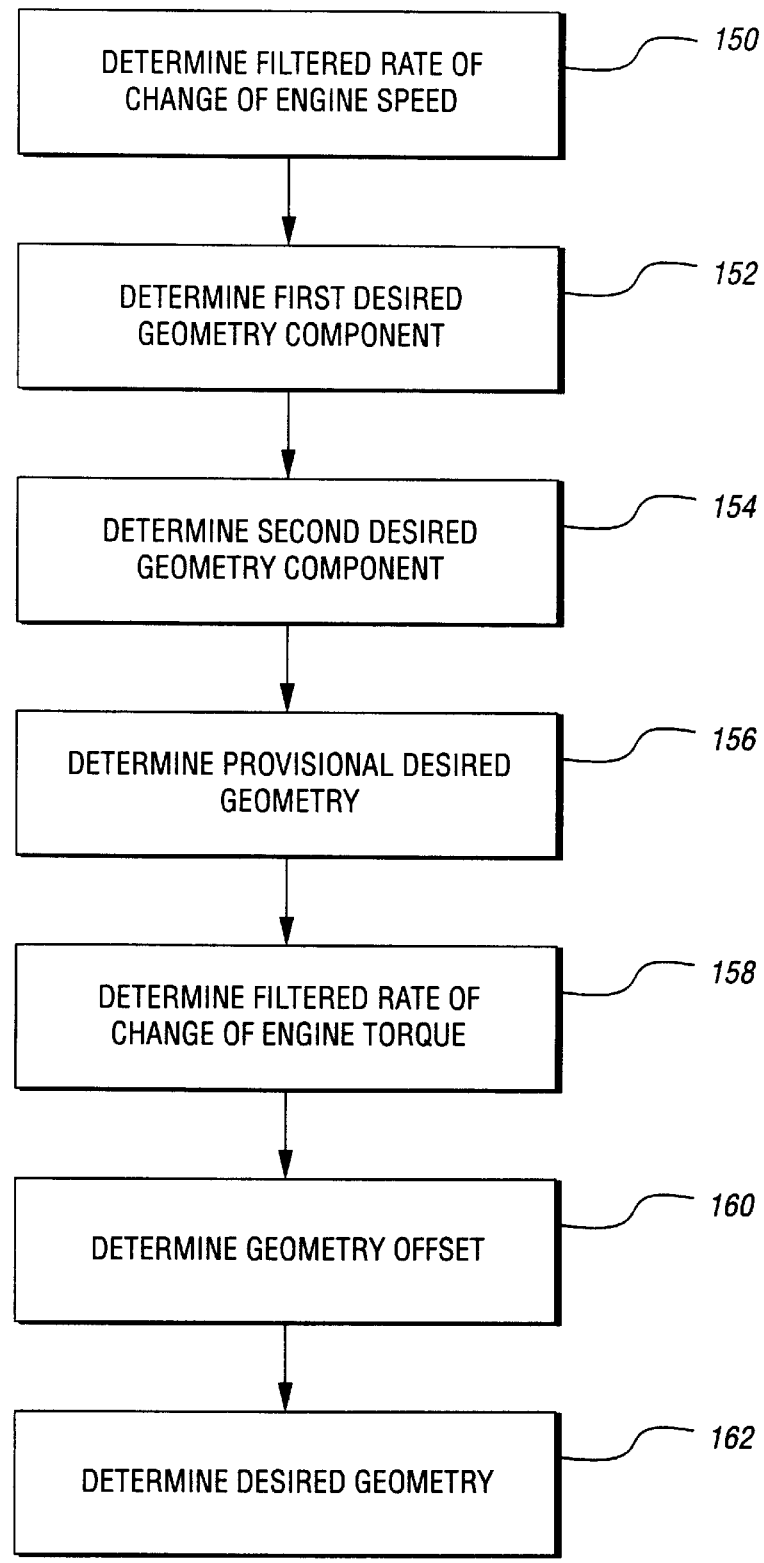
FIG. 6 is a block diagram illustrating a method of the present invention for determining desired turbocharger geometry when the engine is in the normal operating mode.

With reference to FIG. 6, a preferred method of the present invention for determining desired turbocharger geometry is illustrated. At block 150, a filtered rate of change of the engine speed parameter is determined. When the engine is operating in the normal operating mode, block 152 determines desired turbocharger geometry at steady state engine speed. Further, block 154 determines desired turbocharger geometry at transient engine speed. At block 156, a provisional desired turbocharger geometry is determined based on the steady state and transient desired turbocharger geometries. When the engine speed parameter is greater than the engine speed limit or the engine torque parameter is greater than the engine torque demand limit, the provisional desired turbocharger geometry is a weighted sum of the steady state and transient desired geometries. The weighting factors for each component, that is, the steady state component and transient component, are determined from RATP which is a filtered, limited, and scaled rate of change of the engine speed parameter. When the engine speed parameter is below the engine speed limit and the engine torque parameter is below the torque demand limit, the desired turbocharger geometry is selected as either the steady state geometry or the transient geometry based on the value of RATP.

It is to be appreciated that when the engine is not operating in the normal mode, that is, the engine is operating in start mode, idle mode, or engine braking mode, or any other special engine mode implemented in the control system, the desired turbocharger geometry may be determined by other methods such as a single look-up table for each special engine mode.

In a preferred embodiment when operating in the normal operating mode, a filtered rate of change of the engine torque parameter is determined at block 158. At block 160, a geometry offset is determined based on the filtered rate of change of the engine torque parameter. Preferably, the geometry offset is further based on the engine speed parameter. At block 160, desired turbocharger geometry for current engine conditions is determined based on the provisional desired turbocharger geometry and the geometry offset.

It is to be appreciated that the engine speed parameter and the engine torque parameter are preferred engine parameters for determining desired turbocharger geometries. Other engine parameters may be substituted for or may supplement the engine speed and torque parameters, if so desired. Further, various other methods for determining desired turbocharger geometry based on engine conditions and parameters may be utilized in embodiments of the present invention.

Figure 7:
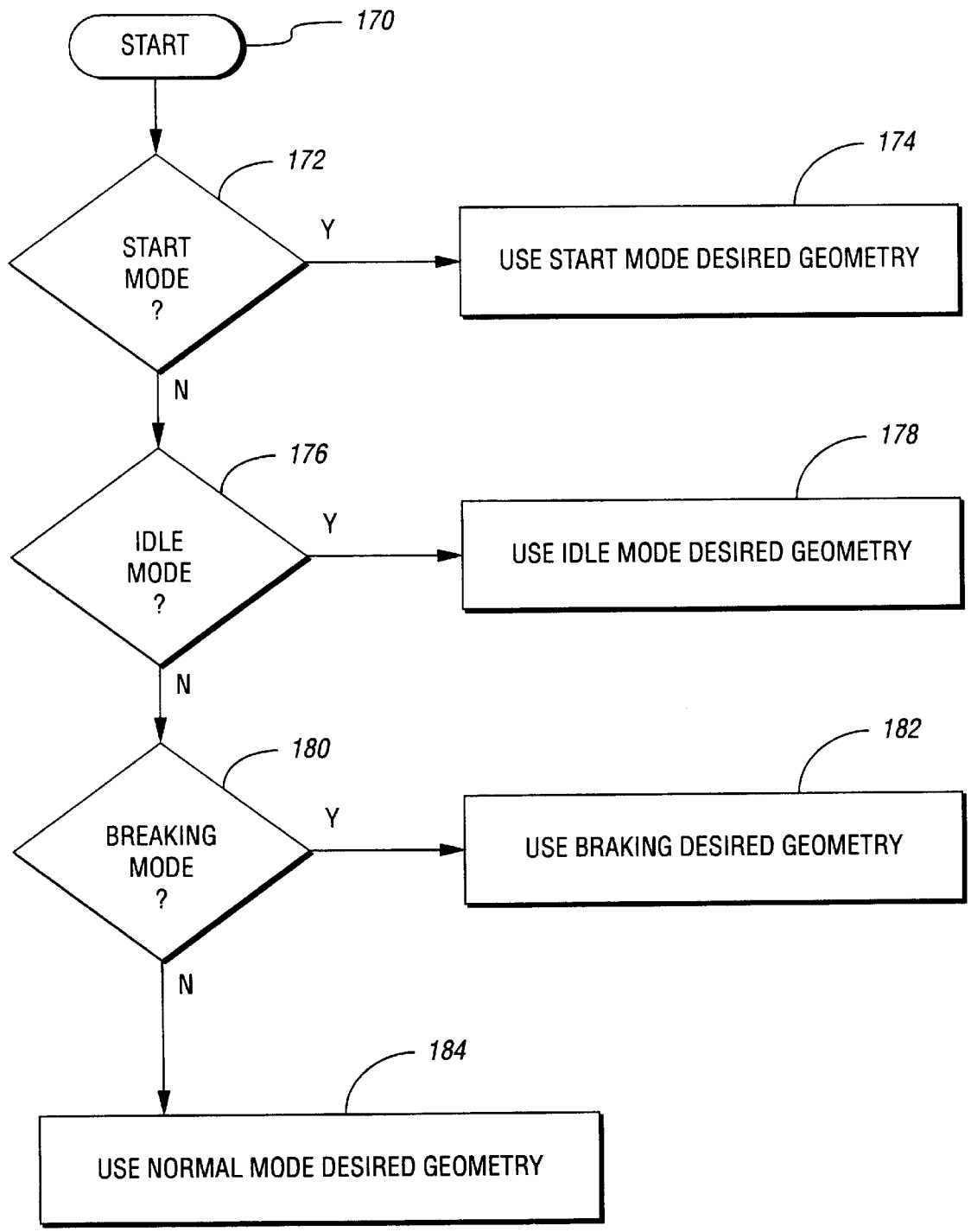
FIG. 7 is a flow chart illustrating a method of the present invention for determining the engine mode of operation and the corresponding turbocharger geometry, based on current engine conditions.

Referring to FIG. 7, a method of the present invention for determining the engine operating mode is illustrated. Beginning at start block 170, a check for engine start mode is performed at decision block 172. If the engine is in start mode, block 174 directs the controller to use start mode desired geometry, which is preferably implemented via a look-up table as previously described. At decision block 176, a controller checks to see if the engine is operating in idle mode. If the engine is operating in idle mode, the controller uses the idle mode desired turbocharger geometry look-up table, as indicated at block 178. At decision block 180, the controller checks to see if the engine is in engine braking mode. If it is determined that the engine is in engine braking mode, the braking mode desired turbocharger geometry look-up table is used, as indicated at block 182. If the engine is not operating in start mode, idle mode, or engine braking mode, the engine is then determined to be operating in normal mode. Normal mode desired geometry look-up tables are then used, as indicated at block 184.

It is to be appreciated that other operating modes may be substituted for those illustrated, or additional operating modes may be supplemented to those illustrated. Further, it is to be appreciated that the mode determination process may be implemented in a variety of ways, allowing for various ordering of the decision blocks 172, 176, 180, or any other decision blocks.

It is to be understood that systems and methods of the present invention may control a vehicle having an internal combustion engine with a variable geometry turbocharger. The system and method of the present invention provide closed loop control based on an error signal determined from a current turbocharger geometry and a desired turbocharger geometry for current engine conditions.

While the best mode for carrying out the invention has been described in detail, those familiar with the art to which this invention relates will recognize various alternative designs and embodiments for practicing the invention as defined by the following claims.

What is claimed is:

1. A system for controlling a vehicle having an internal combustion engine, a plurality of engine sensors having outputs indicative of current engine conditions, and a variable geometry turbocharger in which geometry is varied by a controllable actuator, the system comprising:

a turbocharger sensor having an output indicative of a current turbocharger geometry;

control logic for determining an engine speed:

control logic for determining an engine torque demand;

control logic for determining a desired turbocharger geometry based on the current engine conditions including the engine speed and the engine torque demand;

control logic for determining an error signal by comparing the current turbocharger geometry to the desired turbocharger geometry; and control logic for controlling the actuator based on the error signal to change the current turbocharger geometry so as to track the desired turbocharger geometry.

2. The system of claim 1 wherein the control logic for controlling the actuator further comprises:

control logic for determining at least one control term;

control logic for determining a modulated signal based on the at least one control term and the error signal; and control logic for applying the modulated signal to an input of the actuator.

3. The system of claim 1 wherein the control logic for controlling the actuator further comprises:

control logic for determining an action signal based on the error signal, when error signal magnitude exceeds an action threshold value;

control logic for determining at least one control term;

control logic for determining a modulated signal based on the at least one control term and the action signal; and control logic for applying the modulated signal to an input of the actuator.

4. The system of claim 1 wherein the control logic for determining a desired turbocharger geometry further comprises:

control logic for selecting an engine operating mode from the group consisting of a normal mode and at least one special mode based on the current engine conditions;

control logic for determining a desired turbocharger geometry when the engine operating mode is the normal mode; and control logic for determining a desired turbocharger geometry when the engine operating mode is the at least one special mode.

5. A system for controlling a vehicle having an internal combustion engine, a plurality of engine sensors having outputs indicative of current engine conditions, and a variable geometry turbocharger in which geometry is varied by a controllable actuator, the system comprising:

a turbocharger sensor having an output indicative of a current turbocharger geometry;

control logic for selecting an engine operating mode from the group consisting of a normal mode and at least one special mode based on the current engine conditions;

control logic for determining a desired turbocharger geometry based on the current engine conditions when the engine operating mode is the normal mode;

control logic for determining a desired turbocharger geometry based on the current engine conditions when the engine operating mode is the at least one special mode;

control logic for determining an error signal by comparing the current turbocharger geometry to the desired turbocharger geometry; and control logic for controlling the actuator based on the error signal to change the current turbocharger geometry so as to track the desired turbocharger geometry, wherein the control logic for determining a desired turbocharger geometry when the engine operating mode is the normal mode includes control logic for determining a filtered rate of change of a first engine parameter based on the current engine conditions, control logic for determining a desired turbocharger geometry for steady state conditions of the first engine parameter, control logic for determining a desired turbocharger geometry for transient conditions of the first engine parameter, and control logic for determining the desired turbocharger geometry based on the desired turbocharger geometry for steady state conditions of the first engine parameter, the desired turbocharger geometry for transient conditions of the first engine parameter, and the filtered rate of change of the first engine parameter.

6. The system of claim 5 wherein the control logic for determining the desired turbocharger geometry further comprises:

control logic for determining a filtered rate of change of a second engine parameter;

control logic for determining a geometry offset based on the filtered rate of change of the second engine parameter; and control logic for determining the desired turbocharger geometry based on the desired turbocharger geometry for steady state conditions of the first engine parameter, the desired turbocharger geometry for transient conditions of the first engine parameter, and the geometry offset.

7. An article of manufacture including a computer readable storage medium having information stored thereon representing instructions executable by a computer to control a vehicle having an internal combustion engine, a plurality of engine sensors indicative of current engine conditions, and a variable geometry turbocharger in which geometry is varied by a controllable actuator, the computer readable storage medium further comprising:

instructions for determining a current turbocharger geometry based on an output of a turbocharger sensor;

instructions for determining an engine speed;

instructions for determining an engine torque demand;

instructions for determining a desired turbocharger geometry based on the current engine conditions including the engine speed and the engine torque demand;

instructions for determining an error signal by comparing the current turbocharger geometry to the desired turbocharger geometry; and instructions for controlling the actuator based on the error signal to change the current turbocharger geometry so as to track the desired turbocharger geometry.

8. The article of manufacture of claim 7 wherein the instructions for controlling the actuator further comprise:

instructions for determining at least one control term;

instructions for determining a modulated signal based on the at least one control term and the error signal; and instructions for applying the modulated signal to an input of the actuator.

9. The article of manufacture of claim 7 wherein the instructions for controlling the actuator further comprise:

instructions for determining an action signal based on the error signal, when error signal magnitude exceeds an action threshold value;

instructions for determining at least one control term;

instructions for determining a modulated signal based on the at least one control term and the action signal; and instructions for applying the modulated signal to an input of the actuator.

10. The article of manufacture of claim 7 wherein the instructions for determining a desired turbocharger geometry further comprise:

instructions for selecting an engine operating mode from the group consisting of a normal mode and at least one special mode based on the current engine conditions;

instructions for determining a desired turbocharger geometry when the engine operating mode is the normal mode; and instructions for determining a desired turbocharger geometry when the engine operating mode is the at least one special mode.

11. An article of manufacture for controlling a vehicle having an internal combustion engine, a plurality of engine sensors having outputs indicative of current engine conditions, and a variable geometry turbocharger in which geometry is varied by a controllable actuator, the computer readable storage medium further comprising:

instructions for determining a turbocharger geometry based on an output of a turbocharger sensor;

instructions for selecting an engine operating mode from the group consisting of a normal mode and at least one special mode based on the current engine conditions;

instructions for determining a desired turbocharger geometry based on the current engine conditions when the engine operating mode is the normal mode;

instructions for determining a desired turbocharger geometry based on the current engine conditions when the engine operating mode is the at least one special mode; instructions for determining an error signal by comparing the current turbocharger geometry to the desired turbocharger geometry; and instructions for controlling the actuator based on the error signal to change the current turbocharger geometry so as to track the desired turbocharger geometry, wherein the instructions for determining a desired turbocharger geometry when the engine operating mode is the normal mode include instructions for determining a filtered rate of change of a first engine parameter based on the current engine conditions, instructions for determining a desired turbocharger geometry for steady state conditions of the first engine parameter, instructions for determining a desired turbocharger geometry for transient conditions of the first engine parameter, and instructions for determining the desired turbocharger geometry based on the desired turbocharger geometry for steady state conditions of the first engine parameter, the desired turbocharger geometry for transient conditions of the first engine parameter, and the filtered rate of change of the first engine parameter.

12. The article of manufacture of claim 11 wherein the instructions for determining the desired turbocharger geometry further comprise:

instructions for determining a filtered rate of change of a second engine parameter based on the current engine conditions;

instructions for determining a geometry offset based on the filtered rate of change of the second engine parameter; and instructions for determining the desired turbocharger geometry based on the desired turbocharger geometry for steady state engine conditions of the first engine parameter, the desired turbocharger geometry for transient conditions of the first engine parameter, and the geometry offset.

13. A vehicular control system comprising:

an internal combustion engine having a plurality of cylinders;

a plurality of fuel injectors for supplying fuel to the plurality of cylinders;

a plurality of engine sensors having outputs indicative of current engine conditions;

a variable geometry turbocharger including a controllable actuator for varying the turbocharger geometry;

a turbocharger sensor having an output indicative of a current turbocharger geometry;

control logic for determining an engine speed parameter indicative of engine speed;

control logic for determining an engine torque parameter indicative of engine torque demand;

control logic for determining a desired turbocharger geometry based on the engine speed parameter and the engine torque parameter;

control logic for determining an error signal by comparing the current turbocharger geometry to the desired turbocharger geometry; and control logic for controlling the actuator based on the error signal to change the current turbocharger geometry so as to track the desired turbocharger geometry.

14. The vehicular control system of claim 13 wherein the control logic for determining a desired turbocharger geometry further comprises:

control logic for determining a filtered rate of change of the engine speed parameter; and control logic for determining a desired turbocharger geometry based on the engine speed parameter, the filtered rate of change of the engine speed parameter, and the engine torque parameter.

15. A vehicular control system comprising:

an internal combustion engine having a plurality of cylinders;

a plurality of fuel injectors for supplying fuel to the plurality of cylinders;

a plurality of engine sensors having outputs indicative of current engine conditions;

a variable geometry turbocharger including a controllable actuator for varying the turbocharger geometry;

a turbocharger sensor having an output indicative of a current turbocharger geometry;

control logic for determining an engine speed parameter indicative of engine speed;

control logic for determining an engine torque parameter indicative of engine torque demand;

control logic for determining a filtered rate of change of the engine torque parameter;

control logic for determining a desired turbocharger geometry based on the engine speed parameter, the engine torque parameter, and the filtered rate of change of the engine torque parameter;

control logic for determining an error signal by comparing the current turbocharger geometry to the desired turbocharger geometry; and control logic for controlling the actuator based on the error signal to change the current turbocharger geometry so as to track the desired turbocharger geometry.

* * * * *